United States Patent
Bock et al.

(10) Patent No.: US 7,266,299 B1
(45) Date of Patent: Sep. 4, 2007

(54) ADD/DROP-DROP AND CONTINUE-MODULE AND DROP AND CONTINUE MODULE

(75) Inventors: Harald Bock, Munich (DE); Patrick Leisching, Munich (DE); Alexander Richter, Munich (DE); Detlef Stoll, Boca Raton, FL (US)

(73) Assignee: Siemens Aktiengesellschaft, Munich (DE)

( * ) Notice: Subject to any disclaimer, the term of this patent is extended or adjusted under 35 U.S.C. 154(b) by 360 days.

(21) Appl. No.: 09/644,881

(22) Filed: Aug. 23, 2000

(30) Foreign Application Priority Data

Aug. 23, 1999 (DE) ................................ 199 39 853

(51) Int. Cl.
*H04J 14/02* (2006.01)
(52) U.S. Cl. ............................. 398/85; 398/83; 398/84
(58) Field of Classification Search ................ 359/124, 359/127, 128, 130, 308, 359, 563, 568, 569, 359/572; 385/24; 398/85, 84, 83, 87
See application file for complete search history.

(56) References Cited

U.S. PATENT DOCUMENTS

| | | | | |
|---|---|---|---|---|
| 5,706,375 A | * | 1/1998 | Mihailov et al. | 385/24 |
| 5,712,717 A | * | 1/1998 | Hamel et al. | 398/85 |
| 5,712,932 A | * | 1/1998 | Alexander et al. | 385/24 |
| 5,748,349 A | * | 5/1998 | Mizrahi | 398/84 |
| 6,602,000 B1 | * | 8/2003 | Madsen | 398/84 |

OTHER PUBLICATIONS

Drop-Filter mit Zrkulator und durchstimmbarem FBG—p. 89, Aug. 19, 1999.

* cited by examiner

*Primary Examiner*—M. R. Sedighian
(74) *Attorney, Agent, or Firm*—Bell, Boyd & Lloyd LLP

(57) ABSTRACT

A tunable add/drop&continue or drop&continue module comprises two optical filters where at least one is tunable and that are arranged following one another between a branching unit for optical signals and an insertion unit follow a branching unit for optical signals. The reflection attenuation of the one tunable optical filter is lower and the transmission attenuation higher than that of the other optical filter, as a result of which the drop&continue function of the module can be realized without high circuit-oriented expense.

8 Claims, 2 Drawing Sheets

ADD/DROP-DROP AND CONTINUE-MODULE AND DROP AND CONTINUE MODULE

BACKGROUND OF THE INVENTION

The invention is directed to a tunable add/drop-drop&continue module and to a tunable drop&continue module.

Existing and future optical transmission systems or, networks, particularly transmission systems or, respectively, networks working according to the WDM principle (wavelength division multiplexing), are usually redundantly designed in order to assure an optimally disruption-free optical signal transmission, i.e., for example, the one and the corresponding, redundant connection within an optical transmission system or network are set up—for dependability reasons—via different, mainly spatially separately conducted optical fibers.

Further ring structures are often provided for the realization of the optical communication network. At transitions between different rings or, respectively, ring transmission networks, "add/drop" or, respectively, "drop&continue" functions are provided with the assistance of which the optical signal to be transmitted is split and is forwarded both in the original ring as well as in the new ring or, respectively, even further signals exhibiting a different optical wavelength or, respectively, frequency are added. Wavelength demultiplexers, optical switches and wavelength multiplexers can be utilized for the purely optical realization of such drop&continue functions.

For realizing add/drop functions, modules are known that are composed of two circulatory with intervening, tunable filters, for example fiber Bragg gratings. With respect thereto, see the product note "Drop-Filter mit Zirkulator und durchstimmbaren Faser-Bragg-Gitter" of Laser2000 GmbH (http://www.laser2000.de). These modules are suitable for the realization of drop&continue functions. However, it is conceivable to supplement such a module with optical splitters and optical switches in order to realize the drop&continue functionality.

U.S. Pat. No. 5,748,349 discloses a "Grating-based optical Add/Drop Multiplexer for WDM optical communication systems" wherein add/drop functions are realized with the assistance of tunable fiber Bragg gratings arranged following an optical circulator. For this purpose, the resonant frequency of the fiber Bragg grating exhibiting a low reflection attenuation at the resonant frequency is tuned to the frequency of the optical signal to be delivered and, as a result thereof, the optical signal supplied into the tuned fiber Bragg grating is nearly completely reflected and back-scattered to the preceding optical circulator. With the assistance of the circulator, the reflected optical signal is conducted to the optical "drop" fiber a further optical splitter and switches are also to be provided here for the realization of a drop&continue function, these causing an additional attenuation of the optical signal to be transmitted.

Figure a shows an "add/drop-drop&continue module" realized according to the Prior Art. It is composed of an optical splitter SP that divides an optical signal OS into two sub-signals $D_K$, $C_K$ of approximately equal strength, of a first and of a second optical circulator Z11, Z12, of a tunable optical filter BSF, for example a fiber Bragg grating, and of an optical switch SW. For realizing the drop&continue function, the one signal part $D_K$ is conducted over the first and second optical circulator Z11, Z12 with an intervening, tunable optical filter BSF, and the other signal part $C_K$ is forwarded via the optical switch SW (illustrated switch position).

Given an add/drop function, the one signal part $D_K$ is likewise branched off. Simultaneously, a new optical signal $A_K$ with the same wavelength can be inserted via the second optical circulator Z12. As a result of employing the optical splitter SP, the module fundamentally comprises an additional attenuation of at least 3 dB. Corresponding to the plurality of add/drop functions or drop&continue functions, the described add/drop or, respectively, drop&continue module is multiply connected in series, as a result of which the attenuation is additionally considerably increased.

SUMMARY OF THE INVENTION

An object underlying the invention is comprised in specifying an add/drop-drop&continue module or a drop&continue module with lower insertion attenuation.

According to the invention, a tunable add/drop-drop & continue module is provided having two optical filters where at least one is tunable and are arranged in series between a branching unit for optical signals and in an insertion unit. The one tunable optical filter comprises a lower reflection attenuation and a higher transmission attenuation than the other optical filter.

Also according to the invention, a tunable add/drop-drop&continue module is provided with two optical filters where at least one is tunable and that follow a branching unit for optical signals. The one tunable optical filter comprises a lower reflection attenuation and a higher transmission attenuation than the other optical filter.

A critical aspect of the invention is to be seen therein that the tunable add/drop-drop&continue module or the drop&continue module comprises two optical filters, whereof at least one is tunable, and that are arranged following one another between a branching units for optical signals and an insertion unit or, that follow a branching unit for optical signals, whereby the one tunable optical filter comprises a lower reflection attenuation and a higher transmission attenuation than the other optical filter. Due to the employment of at least one tunable and one further optical filter, the drop&continue functionality in the inventive add/drop-drop&continue or drop&continue module is advantageously realized with little circuit-oriented expense, i.e. no power splitter and/or additional optical switches are required for the realization of the inventive drop&continue functionality. Further, it is also advantageous in the inventive add/drop-drop&continue or, respectively, drop&continue module to tune only the resonant frequency or pass frequency of the respective, tunable optical filter, for example fiber Bragg grating, in order to be able to reconfigure between the drop function and the drop&continue function. For realizing the drop function, the resonant frequency or pass frequency of the tunable optical filter comprising a lower reflection attenuation and a higher transmission attenuation is tuned to the frequency of the optical signal to be diverted. The tunable optical filter reflects the optical signal nearly completely. The transmission attenuation and the reflection attenuation are thereby defined as follows:

Transmission attenuation:

$$-\log 10\left(\frac{\text{power of the transmitted optical signal}}{\text{power of the received optical signal}}\right)$$

Reflection attenuation:

$$-\log 10\left(\frac{\text{power of the reflected optical signal}}{\text{power of the received optical signal}}\right)$$

Analogous thereto, the resonant frequency or the pass frequency of the tunable optical filter comprising a lower reflection attenuation and a higher transmission attenuation is shifted into the frequency range between two neighboring WDM transmission channels for realizing the drop&continue function so that no "disturbance" or filtering of the incoming optical signal occurs due to the stop region of the tunable optical filter, and, using the second optical filter comprising a higher reflection attenuation and a lower transmission attenuation, about half of the optical signal is reflected and the remaining signal part is forwarded.

A further critical advantage of the invention is that both optical filters are tunable and implemented as band elimination filters. Advantageously, the two optical filters respectively form a filter stage and a plurality of such filter stages are connected in series. Due to the employment of two tunable filters, the nearly completely "reflective" optical filter can also be advantageously connected following the half "transmissive" or "reflective" optical filter, and a plurality of WDM channels can be simultaneously coupled out or in and/or forwarded. Given the inventive employment of two tunable optical filters, additionally, the resonant frequency of the two tunable optical filters can, for example, be shifted into the frequency range between the neighboring WDM channel and the WDM channel under consideration, as a result of which the incoming optical signal can be conducted through the inventive module without a part of the optical signal being carried off or without another optical signal being supplied. No filtering by the two optical filters is thus carried out at the optical signal and the incoming optical signal is conducted through the module. In the technical field, the transit of the optical signal is referred to as an "express" mode.

Further advantageous developments of the inventive add/drop-drop&continue module or of the drop&continue module, particularly a tunable add/drop-drop&continue or drop&continue unit can be derived from the other claims.

The invention is explained in greater detail below on the basis of exemplary embodiments.

DESCRIPTION OF THE PREFERRED EMBODIMENTS

Figure 1:
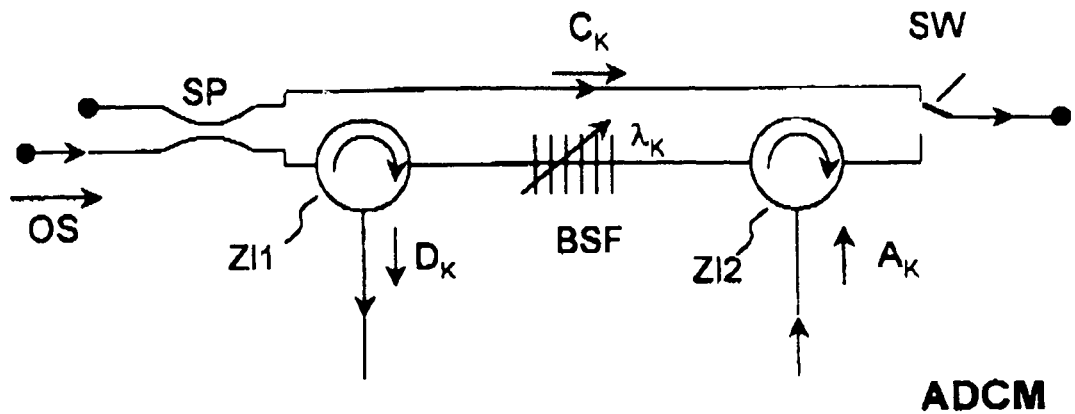
FIG. 1 an add/drop-drop&continue module of the Prior Art.

The add/drop-drop&continue module shown in FIG. 1 has already been explained in greater detail in the introduction to the specification. The splitter SP and the optical switch SW can be omitted given exclusive realization of add/drop functions. The optical splitters SP and optical switches SW can also be eliminated given employment of optical filters BSF that are adjustable in view of their pass behavior as well as reflection and transmission behavior. However, the development or the design of such flexibly tunable optical filters BSF requires a high and, thus, cost-intensive development expense.

Figure 2:
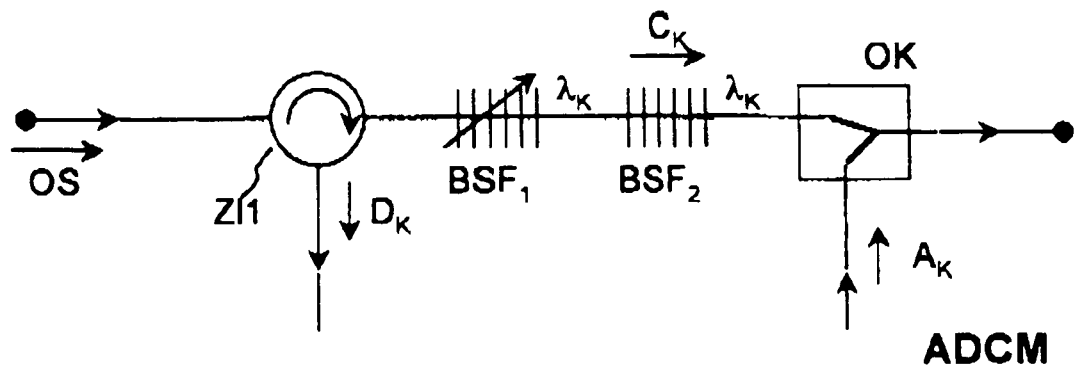
FIG. 2 illustrate the inventive add/drop-drop&continue module.

By way of example, FIG. 2 shows a realization of the inventive add/drop-drop&continue module, whereby—compared to FIG. 1—first and second optical filters $BSF_1$, $BSF_2$ instead of the optical filter BSF are provided for realizing, for example, the drop&continue function, and the second optical circulator Z12 has been replaced by an optical coupler OK. The first optical filter $BSF_1$ is tunable in view of the pass or resonant frequency (or, respectively, wavelength) $\lambda_k$, (respectively indicated by a slanting arrow in the Figures) and has a lower reflection attenuation and a higher transmission attenuation compared to the second optical filter $BSF_2$, the first optical filter reflecting the optical signal OS nearly completely, assuming that its pass frequency lies in the frequency range of the optical signal OS or, respectively, of the WDM channel k to be coupled out. The second optical filter $BSF_2$, for example, is not tunable in view of its pass frequency. It exhibits a lower reflection attenuation and a higher transmission attenuation compared to the tunable, first optical filter $BSF_1$, so that the one signal part $C_K$ of the optical signal OS is forwarded to the optical coupler OK and the further signal part $D_K$ is reflected and is also conducted via the first optical circulator Z11 to the "drop" fiber.

When the inventive add/drop-drop&continue module is configured only for the realization of add&drop functions, then the pass frequency $\lambda_k$ of the first optical filter $BSF_1$ is tuned to the frequency of the WDM channel k to be diverted, as a result whereof a nearly complete reflection of the optical signal OS or a return of the WDM channel k is implemented. The returned or reflected optical signal OS is coupled out via the first optical circulator Z11. Additionally, the "add" function—as already shown in FIG. 1—is realized with the assistance of the optical coupler OK via which the new optical signal $A_K$ comprising the same wavelength is coupled in for further optical transmission. The employment of an optical coupler OK in fact leads to a reduction of the realization costs but also contributes to an increase in the insertion attenuation of the add-drop-continue module by approximately 3 dB.

For realizing the drop&continue function, the pass frequency $\lambda_k$ of the first optical filter $BSF_1$ is moved into the frequency range between one of the neighboring WDM channels k−1, k+1 and the WDM channel k under consideration, i.e. the optical signal OS passes through the first optical filter $BSF_1$ undisturbed and is filtered with the assistance of the second optical filter $BSF_2$ that already exhibits a tuned pass frequency $\lambda_k$. Due to the filtering, nearly half of the optical signal OS is forwarded through the second filter $BSF_2$ in the form of the one signal part $C_K$, and the remaining part of the optical signal OS is reflected in the form of the other signal part $D_K$. By selecting the pass frequency $\lambda_k$, of the tunable, first optical filter $BSF_1$, a switch can be made with the add/drop-drop&continue module of the invention between the add/drop function and the drop&continue function without requiring optical switches.

Figure 3:
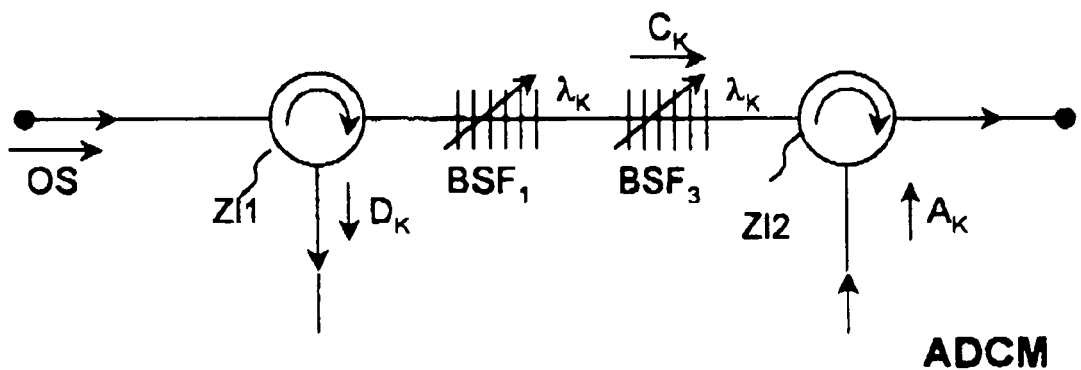
FIG. 3 is a version of this add/drop-drop&continue module.

FIG. 3 shows a version of the add/drop-drop&continue module wherein a third, tunable optical filter $BSF_3$ is provided instead of the second optical filter $BSF_2$, the properties thereof with respect to reflection attenuation and transmission attenuation agreeing with the properties of the second optical filter $BSF_2$. Additionally, the optical coupler OK has been replaced by the second optical circulator Z12. For realizing the add function, the resonant frequency of the first tunable optical filter $BSF_1$ is tuned to the frequency of the new optical signal $A_K$ to be coupled in, as a result whereof the employment of the second optical circulator Z12 becomes possible. The resonant frequency of the third optical filter $BSF_3$ is placed into the frequency range between the WDM channel k under consideration and the neighboring WDM channel k+1.

In the realization of the inventive add/drop-drop&continue module, the second optical circulator Z12 or optical coupler OK provided in the inventive add/drop-drop&continue module can be omitted—which is not explicitly shown in FIGS. 1 through 5.

Figure 4:
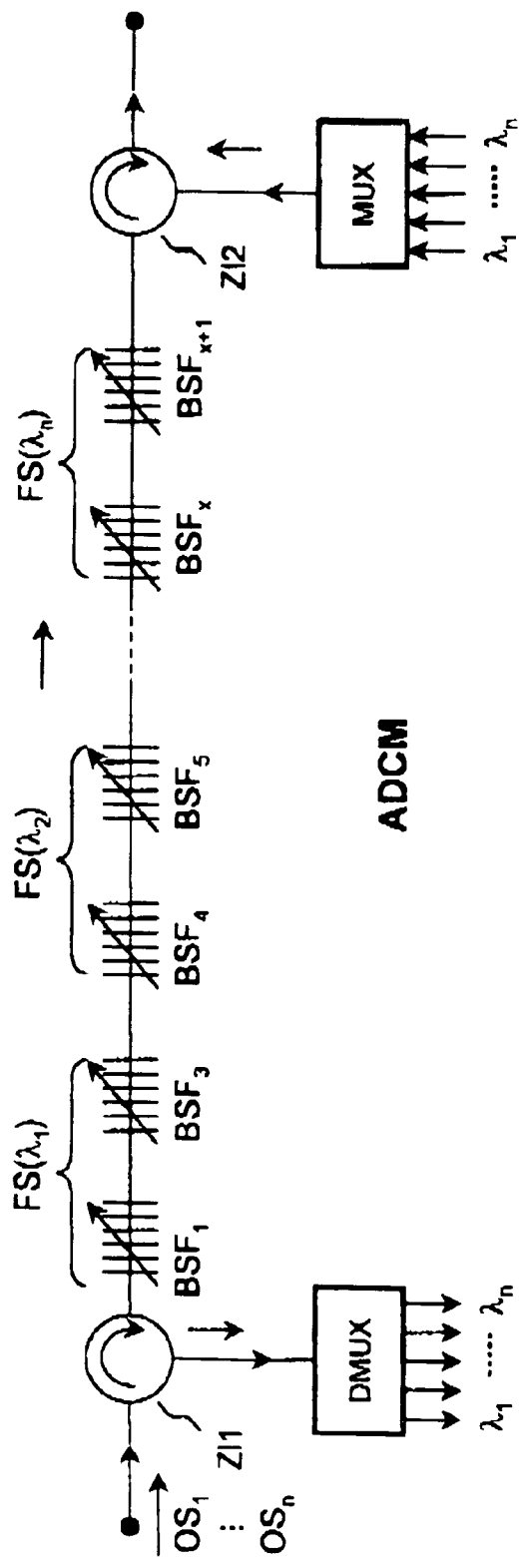
FIG. 4 is a version for the simultaneous outfeed, forwarding and infeed of a plurality of WDM channels.

FIG. 4 shows another version of the inventive add/drop-drop&continue module for the simultaneous outfeed, forwarding and infeed of a plurality of WDM channels (k=1, 2, ..., n). For this purpose a first tunable and third tunable optical filter $BSF_1$, $BSF_3$ are combined to form a filter stage FS1. FS2, ..., FSn, whereby the optical filters $BSF_1$, $BSF_3$ of a filter stage are respectively provided for a specific pass frequency $\lambda_1$. Such filter stages FS1. FS2 ... ,FSn are inserted in series between the first and second circulator Z11, Z12, as a result whereof a plurality of WDM channels (k=1, 2, ..., n) can be coupled out or in as well as forwarded nearly simultaneously. In FIG. 4, a first, second an $n^{th}$ pass frequency or wavelength $\lambda_1$, $\lambda_2$, $\lambda_3$ is shown. The individual optical signals $OS_1$, ..., $OS_n$ or WDM channels (k=1, 2, ..., n) can be branched off or coupled in with a demultiplexer DMUX connected to the first optical circulator Z11 and a multiplexer MUX connected to the second optical circulator Z12.

Figure 5:
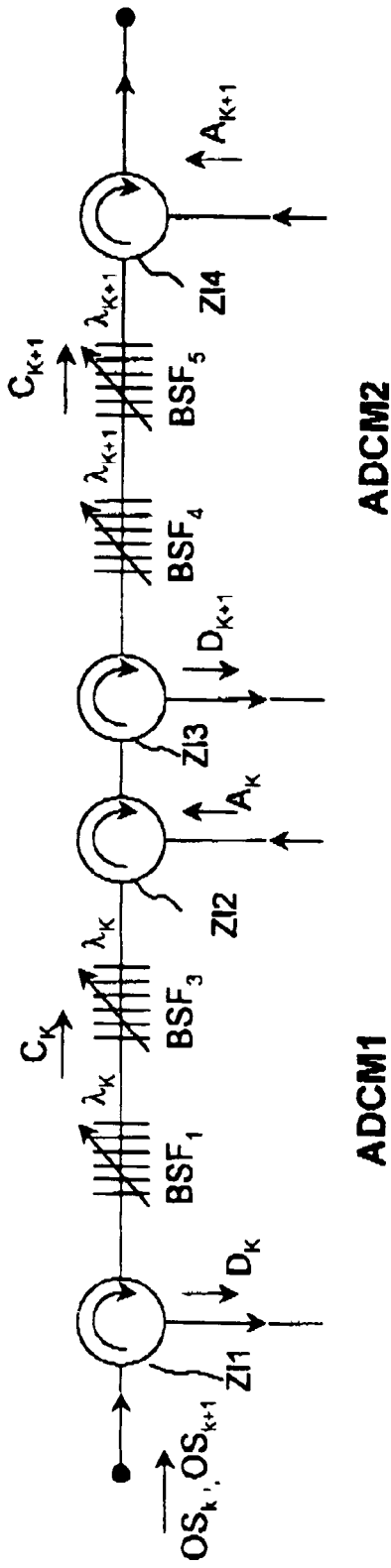
FIG. 5 shows a series circuit of a plurality of add/drop-drop/continue modules.

As a further alternative for being able to branch off or couple in a plurality of optical signals $OS_k$, $OS_{k+1}$ or a plurality of WDM channels k, k+1, a plurality of the inventive add/drop-drop&continue modules ADCM1, ADCM2 according to FIG. 5 can be connected in series. A first signal part $D_K$ is thereby coupled out and a first, new optical signal $A_K$ is thereby coupled in with a first add/drop-drop&continue module ADCM1, and a second signal part $D_{K+1}$ is coupled out and a second new optical signal $A_{K+1}$ is coupled in with a second add/drop-drop&continue module ADCM2.

Although various minor modifications might be suggested by those skilled in the art, it should be understood that our wish is to embody within the scope of the patent warranted hereon all such modifications as reasonably and properly come with the scope of our contribution to the art.

The invention claimed is:

1. A tunable add/drop-drop and continue module, comprising:
    a branching unit for optical signals, wherein each optical signal comprises a plurality of optical transmission channels;
    an insertion unit; and
    first and second tunable optical filters, arranged in series between the branching unit and insertion unit, wherein the first optical filter has a lower reflection attenuation and a higher transmission attenuation than the second optical filter,
    wherein, during the transmission of one of the plurality of transmission channels, the first optical filter is tuned to a pass frequency range that is between two optical transmission channels that neighbor the one transmission channel,
    and wherein the pass frequency of the second optical filter is tuned to a frequency range of the one transmission channel, said second optical filter reflecting a portion of the signal in the one transmission channel received from the first optical filter, and passing the remaining portion of the signal in the one transmission channel to effect a drop-and-continue functionality for the channel within the module.

2. The tunable add/drop-drop and continue module according to claim 1, wherein both the first and second optical filters are implemented as band elimination filters.

3. The tunable add/drop-drop and continue module according to claim 1, wherein circulators are provided as the branching unit.

4. The tunable add/drop-drop and continue module according to claim 1, wherein at least one of circulators and optical couplers are provided as the insertion unit.

5. The tunable add/drop-drop and continue module according to claim 1, wherein the first optical filter precedes the second optical filter.

6. The tunable add/drop-drop and continue module according to claim 1, wherein two optical filters for a filter stage and a plurality of the filter stages are connected in series.

7. The tunable add/drop-drop and continue module according to claim 1, wherein both the first and second optical filters are operated in an express mode.

8. The tunable add/drop-drop and continue module according to claim 1, wherein a plurality of series-connected add/drop-drop and continue modules are provided.

* * * * *